United States Patent [19]

Bechem

[11] Patent Number: 5,190,353
[45] Date of Patent: Mar. 2, 1993

[54] ROCK CUTTING TOOL HAVING ECCENTRIC DRIVE

[76] Inventor: Ulrich Bechem, Tiefendorferstr. 87, D-5800 Hagen 1, Switzerland

[21] Appl. No.: 681,681

[22] Filed: Apr. 8, 1991

[30] Foreign Application Priority Data

Apr. 9, 1990 [CH] Switzerland .................. 1205/90

[51] Int. Cl.⁵ .................................. E21B 10/08
[52] U.S. Cl. .................................. 299/86; 51/169; 125/5; 175/343; 299/89
[58] Field of Search .......... 299/14, 85, 86, 89; 175/55, 343, 350, 376; 173/49; 51/169; 125/5

[56] References Cited

U.S. PATENT DOCUMENTS 3,860,292  1/1975  Bechem .................. 299/86
4,653,594  3/1987  Yamamoto et al. .......... 175/55 X
4,736,987  4/1988  Lenzen et al. ............. 299/86
4,815,543  3/1989  Lenzen et al. ............. 299/86 X

FOREIGN PATENT DOCUMENTS 1442627  12/1988  U.S.S.R. .................. 175/55

Primary Examiner—David J. Bagnell
Attorney, Agent, or Firm—Jones, Tullar & Cooper

[57] ABSTRACT

A rock-cutting tool includes a sleeve equipped with cutting elements and supported on a shaft, the sleeve being separately rotatable and eccentrically arranged in relation to the shaft whereby, in use, rotation of the shaft imparts a radially oscillating motion on the sleeve. At least one adjustable counterweight is connected to the shaft and located within the sleeve.

14 Claims, 4 Drawing Sheets

1

ROCK CUTTING TOOL HAVING ECCENTRIC DRIVE

BACKGROUND OF THE INVENTION

This invention relates to a rock-cutting tool, and more particularly to a percussive rock-cutting tool.

A known problem of rock-cutting tools of this nature is the occurrence of vibrational problems, which can give rise to sufficiently severe shock impulses to damage the associated machinery.

SUMMARY OF THE INVENTION

It is an object of this invention to provide a percussive rock-cutting tool which allows dynamic balancing of the tool.

It is a further object of this invention to provide a percussive rock-cutting tool of which the amplitude of oscillation of the tool is adjustable.

According to the invention there is provided a rock-cutting tool which includes
a sleeve equipped with cutting elements and supported on a rotatable shaft, the sleeve being separately rotatable and eccentrically arranged in relation to the shaft whereby, in use, rotation of the shaft imparts a radially oscillating motion on the sleeve;
at least one adjustable counterweight connected to the shaft and located within the sleeve for the purpose of dynamic balancing of the shaft and sleeve assembly.

The cutting elements may be constituted by roller-type tools. In other embodiments these may be milling tools.

The sleeve equipped with the cutting elements may be supported in cantilever-fashion on the shaft.

Propulsion of the shaft may be effected separately from that of the sleeve. More particularly the sleeve may be rotatable in relation to the shaft by way of a further shaft connected to the sleeve. The rate of rotation of the sleeve may be optionally reduced by means of a brake acting towards the free end of this further shaft. In other embodiments the rate of rotation of the shaft may be propelled by way of a motor coupled to the free end of the shaft allowing the rate of rotation to be increased whenever this is desired.

In an even further embodiment of the invention propulsion of the sleeve may be effected by way of a ring gear and gear wheel meshing with each other in eccentric relation to each other in order to achieve a mechanically reduced propulsion of the sleeve by the shaft on which it is supported. At least one further reduction gear co-operating with the ring gear and gear wheel may be provided, allowing a desired rotational speed for the cutting elements on the sleeve to be achieved.

In a particularly preferred embodiment of the invention an intermediate cylindrical sleeve locatable between the cutting element-bearing sleeve and the shaft on which it is supported may be provided, the inner bore of the intermediate sleeve being arranged in eccentric relationship to its outer perimeter in order to allow adjustment of the amplitude of oscillation of the cutting element-bearing sleeve by rotation of the intermediate sleeve and the shaft in relation to each other about their respective longitudinal axes.

BRIEF DESCRIPTION OF THE DRAWINGS

The invention is described below by way of example with reference to the accompanying diagramatic drawings in which.

DESCRIPTION OF PREFERRED EMBODIMENTS

Figure 1:
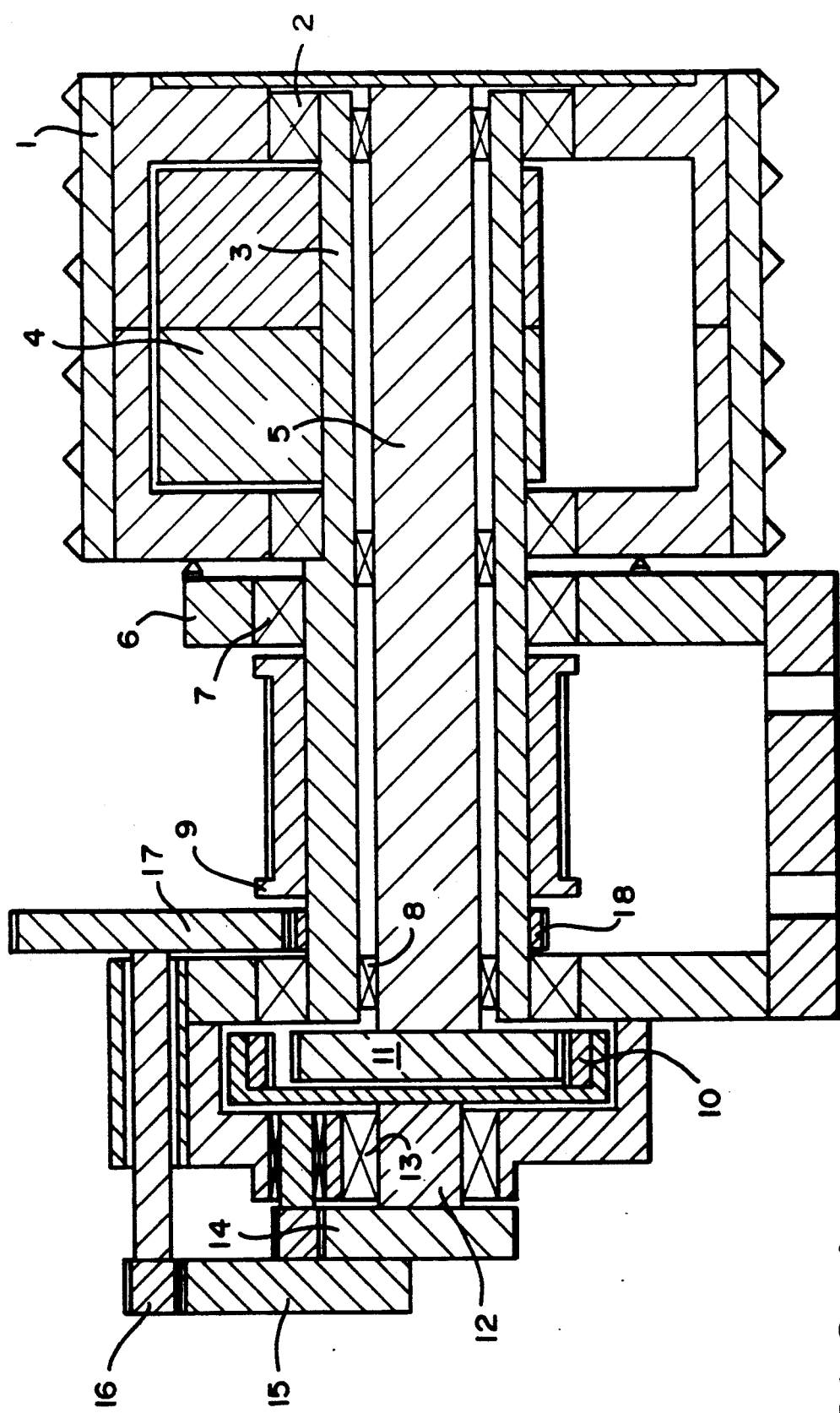
FIG. 1 shows a sectional side elevational view of a rock-cutting tool according to the invention.

The rock-cutting tool shown in FIG. 1 has a cylindrical sleeve 1 equipped with cutting teeth which constitute cutting elements within the meaning of the description of this invention. The sleeve 1 is supported by a pair of bearings 2 on a shaft 3 in cantilever-fashion.

The sleeve 1 is arranged in eccentric relationship to the shaft 3 whereby, in use, rotation of the shaft imparts a radially oscillating motion on the sleeve. In further embodiments of the invention (not shown) the sleeve may be shaped hemispherically, for example, in order to support a drill bit also propelled by the shaft 3 for drilling pilot holes or similar cavities.

Adjustable counterweights 4 are connected to the shaft 3 and located within the sleeve 1 for the purpose of dynamically balancing the shaft and sleeve assembly.

Propulsion of the sleeve 1 is effected by way of a further shaft 5 extending along a bore defined by the shaft 3 and connected at one end to the sleeve as shown in FIG. 1. The shaft 3 is held captive between a pair of supports 6 by way of bearings 7. The shaft 5 in turn is supported within the bore of the shaft 3 by way of bearings 8, allowing the shaft 5, and hence the sleeve 1, to be separately rotatable in relation to the shaft 3.

Propulsion of the shaft 3 is effected by a belt-driven pulley 9 connected to the shaft and driven by a motor (not shown). Propulsion of the shaft 5 is effected by transmitting the rotation of the shaft 3 to the shaft 5 by a transmission system which includes a gear wheel 11 connected at the free end of the shaft 5, and a ring gear 10 connected to a pin 12 running within a bearing 13. Rotation of the shaft 3 is mechanically reduced by a ratio of approximately 20:1 and transmitted to the shaft 5 by way of a gear train comprising a series of gear wheels 14, 15, 16, 17 and 18 meshing with each other and arranged between the shaft 3 and the pin 12 as shown in FIG. 1. In other embodiments (not shown) and excluding the transmission system described above, the speed of rotation of the shaft 5 may be regulated by a braking mechanism or by an external direct drive.

Figure 2:
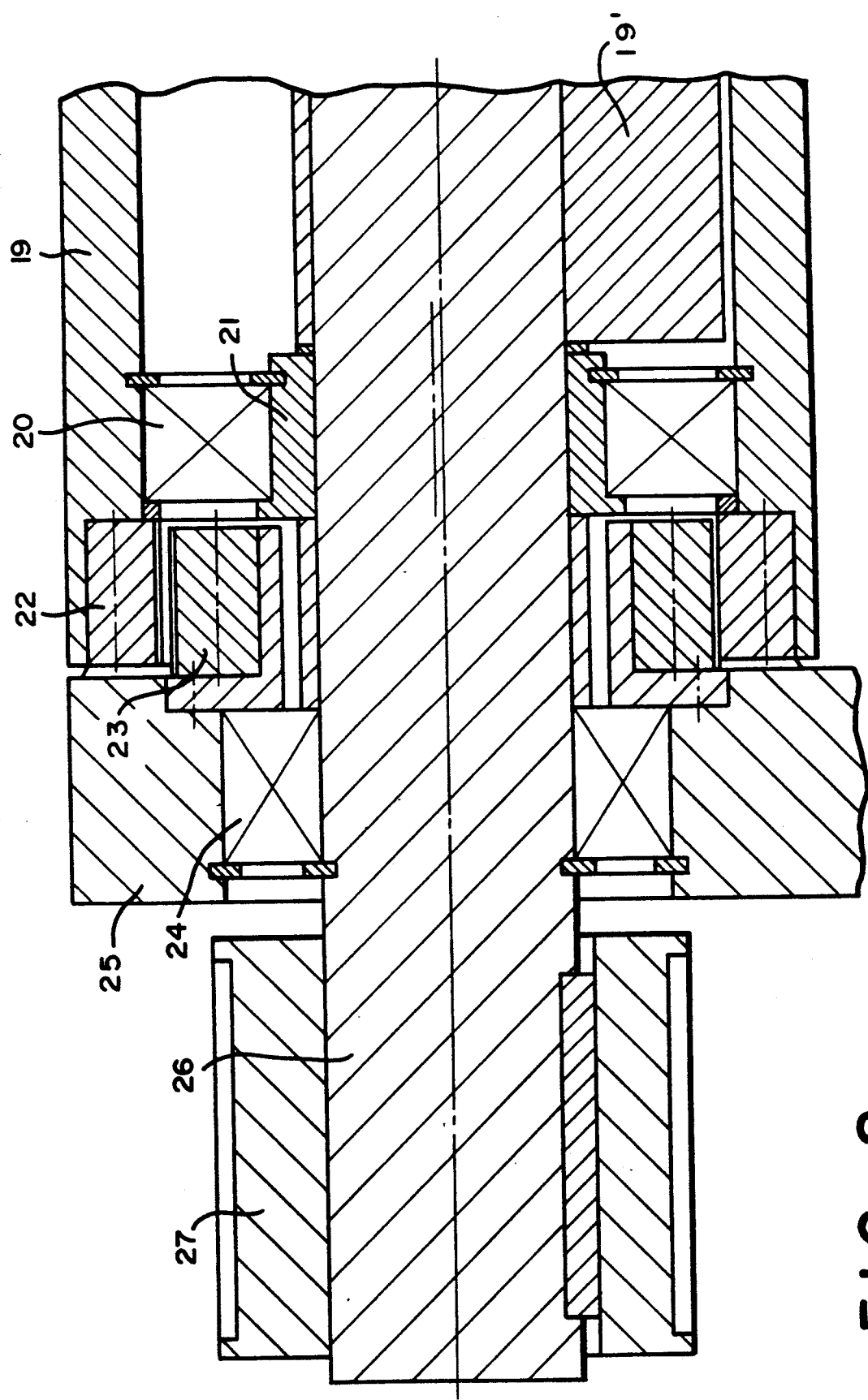
FIG. 2 shows a partial, sectional side elevational view of a further rock-cutting tool according to the invention.

FIG. 2 illustrates a propulsion system for a further rock-cutting tool according to the invention, which includes a sleeve 19 with cutting elements (not shown) supported on a shaft 26 by means of intermediate bearings 20 and shafts 21, only one of each being shown in FIG. 2, and arranged in eccentric relationship to the shaft 26. A ring gear 22 connected to the sleeve 19 meshes with a static gearwheel 23 as shown in FIG. 2.

The shaft 26 is held captive between a pair of supports 25 by way of bearings 24, only one of each being shown in FIG. 2. Adjustable counterweights 19' (only one of which is shown in FIG. 2) are located within the sleeve 19 and are connected to the shaft 26 for the purpose of dynamic balancing. Propulsion is applied to the shaft 26 by way of a V-belt pulley 27; in other embodiments, not further described here, a drive motor may be coupled directly to the shaft.

Figure 3:
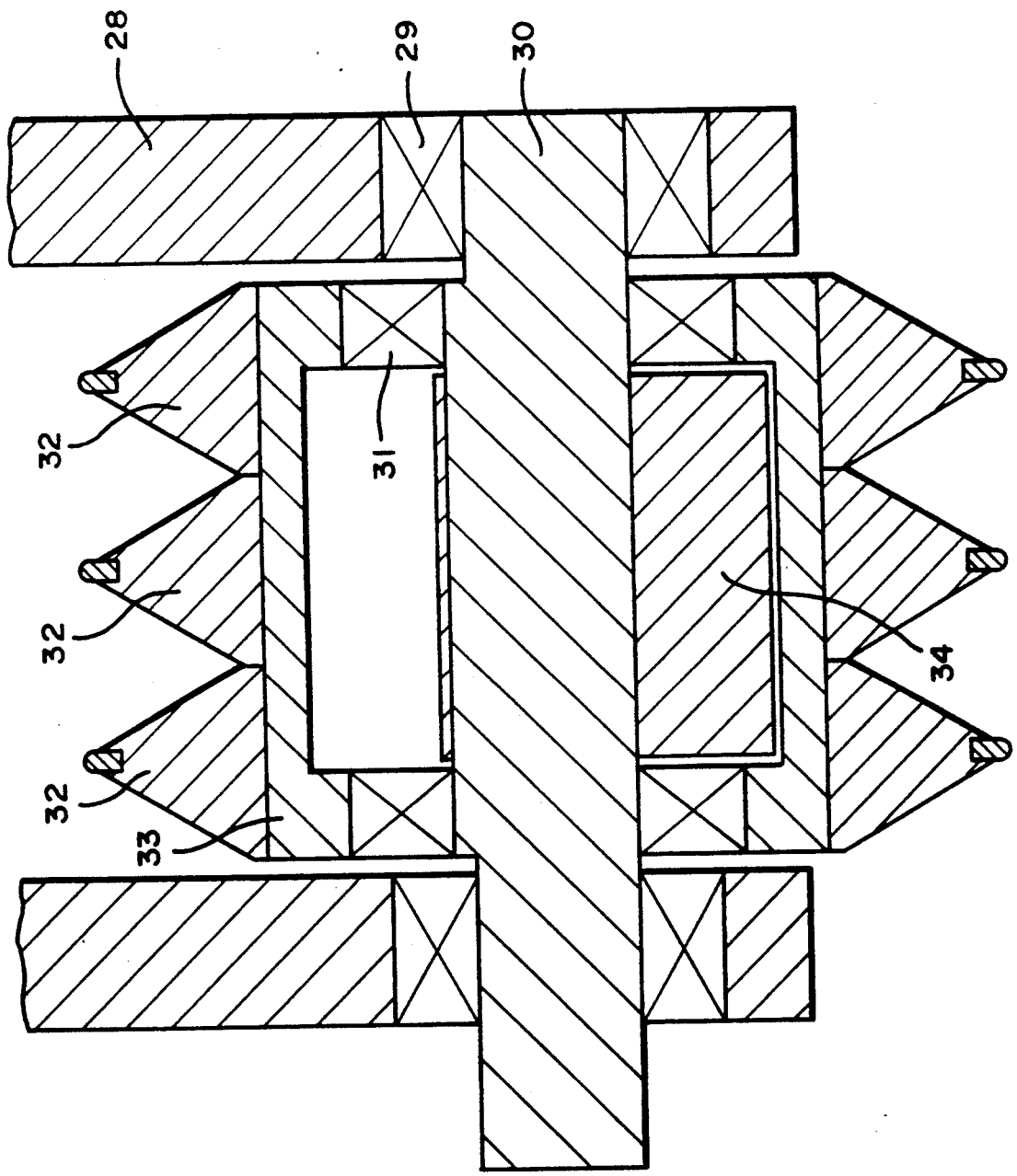
FIG. 3 shows a partial, sectional side elevational view of a sleeve equipped with cutting elements according to the invention.

In yet a further embodiment of the invention shown in FIG. 3 a shaft 30 is held captive between supports 28 by means of bearings 29. A sleeve 33 is supported on, and in eccentric relationship to, the shaft 30 by way of bearings 31. The sleeve 33 is equipped with three cutting disks 32 mounted in juxtaposition to each other and each having wear-metal tips along their peripheries. An adjustable counterweight 34 is connected to the shaft 30 and located within the sleeve 33 as shown in FIG. 3. Propulsion (not shown) is applied to the shaft 30 while the sleeve 33 remains separately rotatable in relation to the shaft by reason of the bearings 31 located between the shaft and sleeve.

In use, a thrust of several 100 kilograms is applied to the rock or similar material being excavated, which compares favourably with thrusts in the region of 10 to 20 tonnes, which are generally required for operating conventional roller-type tools. A particular advantage is seen in the fact that each sleeve 1, 19 or 33, as the case may be, is separately rotatable in relation to its corresponding shaft 3, 26 or 30 respectively, thereby allowing even wear on the respective cutting elements. On the other hand, the sleeves may be optionally kept stationary in relation to their respective shafts for conventional drilling applications. If required, ratchets or similar means may be provided in order to counteract random co-rotation of a sleeve with its shaft.

Figure 4:
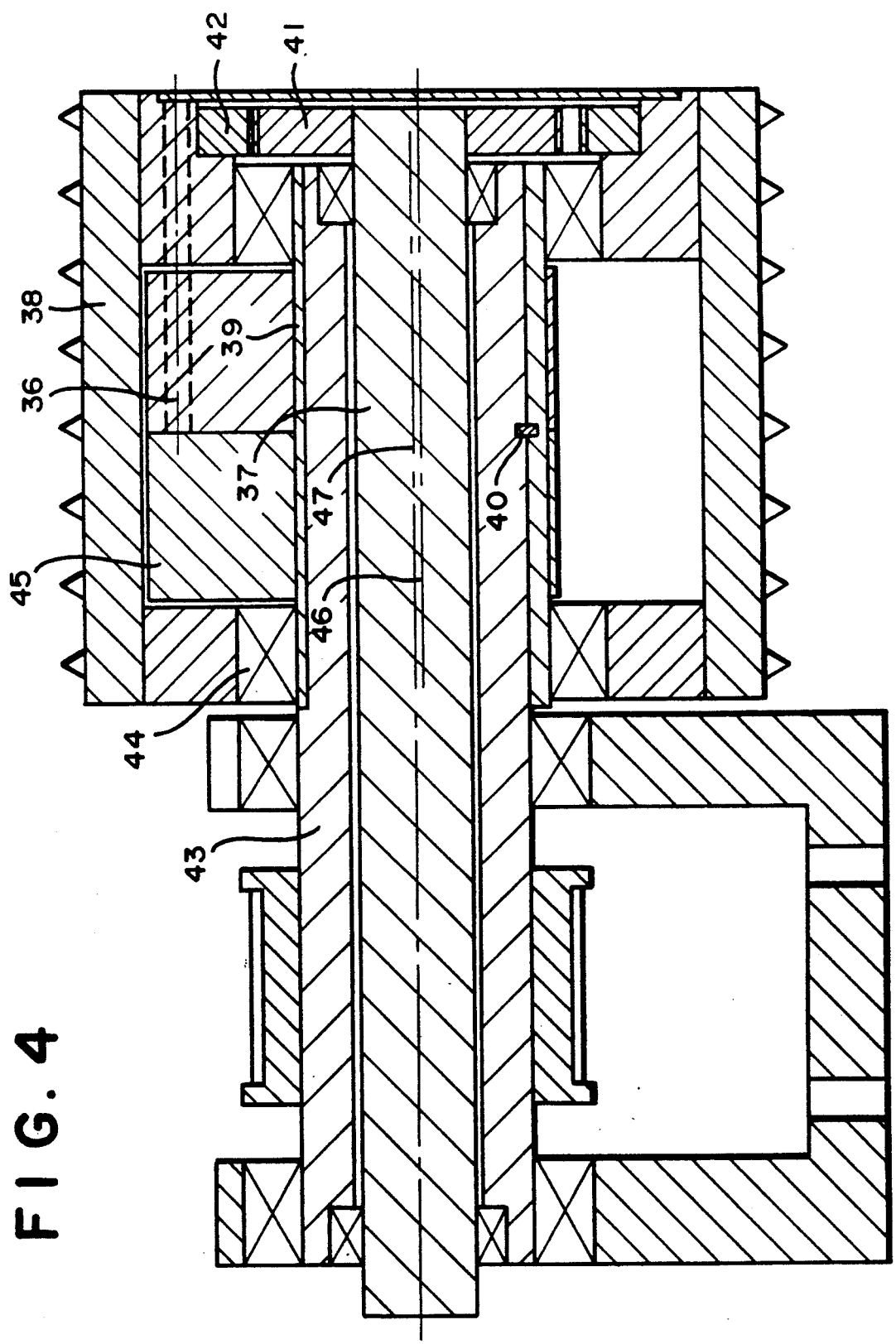
FIG. 4 shows a sectional side elevational view of yet a further embodiment of the invention incorporating an intermediate sleeve for adjustment of the amplitude of oscillation of the cutting element-bearing sleeve during use.

A further, particularly preferred embodiment of the invention is shown in FIG. 4. A thin-walled intermediate sleeve 39 having an inner bore arranged in eccentric relationship to its outer perimeter is positioned between a rotatable shaft 43 and a sleeve 38, supported on the shaft by means of bearings 44, whereby the shaft and sleeve are kept separately rotatable in relation to each other. Adjustable counterweights 45, located within the sleeve 38 and secured to the intermediate sleeve 39, are indirectly connected to the shaft 43, as appears from FIG. 4. Propulsion of the sleeve 38 is ordinarily effected by way of a shaft 37 through a gear wheel 41 connected to this shaft and a ring gear 42, connected to the sleeve 38 and meshing with the gear wheel.

The amplitude of oscillation of the sleeve during use is adjustable by rotation of the intermediate sleeve 39 in relation to the shaft 43 about their respective longitudinal axes 46 and 47 and interlocking them by means of an externally accessible pin 40. The amplitude of oscillation may be optionally set at zero for the purpose of a conventional milling process, in which case the shafts 37 and 43, and the sleeve 38 may be interlocked with each other by means of a pin 36.

During each conversion from one amplitude to another the gear wheel 41 and ring gear 42 must be matched by replacing at least one of these gears. This further involves re-balancing the shaft and sleeve assembly and is expected to be feasible within a matter of minutes. The choice of amplitude is generally determined by the type of material being excavated.

The central arrangement the shaft 37 has the particular advantage that this shaft is not subjected to oscillations, which tends to minimise the load on the bearings and further tends to facilitate braking and/or direct power transmission.

In an alternative embodiment to the rock-cutting tool of FIG. 4 (not further illustrated here) the sleeve is allowed to rotate freely in relation to the shaft 43, allowing the shaft 37, the gear wheel 41 and the ring gear 42 to be omitted.

The applicant believes that the rock-cutting tools described above may be conveniently adapted to allow not only percussive but also steadily rotating propulsion for the purpose of propelling drill bits for pilot holes, major passages, shafts and tunnels. This preferably includes auxiliary propulsion of the drill-head being used in order to ensure continuous rotation in the region of crevices, etc.

The applicant believes that rock-cutting tools according to the invention are expected to be only half as bulky as corresponding conventional ones, and capable of achieving up to twice the drilling rate, particularly in hard rock, while suffering less wear as a result of their even operation.

I claim:

1. A rock cutting tool which includes:
    a sleeve equipped with cutting elements and supported on a rotatable shaft having an axis, the sleeve being separately rotatable with respect to the shaft and eccentrically arranged in relation to the shaft whereby, in use, rotation of the shaft imparts a radially oscillating motion on the sleeve; and
    at least one adjustable counterweight connected to the shaft and located within the sleeve, said counterweight being rotatable with respect to said sleeve for the purpose of dynamic balancing of the shaft and sleeve assembly.

2. A rock-cutting tool according to claim 1 wherein the cutting elements are constituted by roller-type tools.

3. A rock-cutting tool according to claim 1 wherein the cutting elements are constituted by milling tools.

4. A rock-cutting tool according to claims 1, 2 or 3 in which rotation of the shaft and sleeve is effected by separate drives.

5. A rock-cutting tool according to claims 1, 2 or 3 wherein the sleeve is supported in cantilever-fashion on the shaft.

6. A rock cutting tool according to claim 1, wherein said counterweight is located in an aperture within said sleeve and includes an axis of rotation parallel to the axis of the shaft.

7. A rock cutting tool according to claim 6, further including means for rotatably adjusting the counterweight with respect to the shaft and with respect to the sleeve.

8. A rock cutting tool according to claim 1, further including drive means including a ring gear and gear wheel meshing with each other and in eccentric relationship to each other and engaging said shaft to produce a mechanically reduced rate of rotation of the sleeve.

9. A rock cutting tool according to claim 8, further including at least one reduction gear cooperating with the ring gear and the gear wheel to produce a selected rotational speed for the cutting elements on the sleeve.

10. A rock cutting tool which includes:
    a sleeve equipped with cutting elements and supported on a first rotating shaft, the sleeve being separately rotatable and eccentrically arranged in relation to the first shaft whereby rotation of said first shaft imparts a radially oscillating motion on the sleevef a second shaft separately rotatable in relation to the first shaft connected to effect said rotation of the sleeve with respect to the first shaft; and at least one adjustable counterweight connected to the first shaft and located within the sleeve for the purpose of dynamic balancing of the shaft and sleeve assembly.

11. A rock cutting tool according to claim 10 wherein said second shaft has a free end whereby the rate of rotation of the sleeve is capable of being reduced by means of a brake.

12. A rock cutting tool according to claim 10 wherein said second shaft has a free end allowing connection with a motor for increasing the speed of rotation of the sleeve.

13. A rock cutting tool according to claim 10, wherein said second shaft has a free end allowing connection with a motor for increasing the speed of rotation of the sleeve and allowing connection with a brake for reducing the speed of rotation of the sleeve.

14. A rock cutting tool which includes:

a first sleeve equipped with cutting elements;

a rotatable shaft having an axis of rotation;

means including an intermediate cylindrical sleeve having an axis of rotation mounting said first sleeve on said rotatable shaft, said first sleeve being separately rotatable and eccentrically arranged in relation to the shaft, said intermediate sleeve having an inner bore and an outer periphery, said inner bore being in eccentric relationship with said outer periphery whereby rotation of said shaft imparts a radially oscillating motion on the first sleeve, rotation of said intermediate sleeve and said shaft with respect to each other about their respective axes providing adjustment of the amplitude of oscillation of said first sleeve; and at least one adjustable counterweight connected to the shaft and located within the sleeve for dynamically balancing the shaft and first and intermediate sleeves.

* * * * *